(12) United States Patent
Kirst et al.

(10) Patent No.: US 8,651,238 B2
(45) Date of Patent: Feb. 18, 2014

(54) METHOD FOR THE DYNAMIC OIL FILLING OF A TRANSMISSION FOR MOTOR VEHICLES, AND DEVICE FOR CARRYING OUT THE METHOD

(75) Inventors: Christoph Kirst, Wadgassen (DE); Laurent Thommet, Grosbliederstroff (FR); Malte Wilhelm, Volklingen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 147 days.

(21) Appl. No.: 13/127,078

(22) PCT Filed: Nov. 18, 2009

(86) PCT No.: PCT/EP2009/065349
§ 371 (c)(1),
(2), (4) Date: May 2, 2011

(87) PCT Pub. No.: WO2010/063573
PCT Pub. Date: Jun. 10, 2010

(65) Prior Publication Data
US 2011/0247899 A1    Oct. 13, 2011

(30) Foreign Application Priority Data
Dec. 1, 2008 (DE) .......................... 10 2008 044 206

(51) Int. Cl.
*F16H 57/04* (2010.01)
(52) U.S. Cl.
USPC ........................................................ 184/1.5
(58) Field of Classification Search
USPC .................................................. 184/1.5, 106
See application file for complete search history.

(56) References Cited

U.S. PATENT DOCUMENTS

| | | | | |
|---|---|---|---|---|
| 5,226,311 A * | 7/1993 | Scourtes | ..................... | 73/114.42 |
| 5,282,386 A * | 2/1994 | Niemczyk et al. | .............. | 73/292 |
| 5,472,064 A * | 12/1995 | Viken | .............................. | 184/1.5 |
| 5,553,490 A * | 9/1996 | Nicholls et al. | ............ | 73/114.48 |
| 5,860,459 A * | 1/1999 | Reed et al. | ..................... | 141/198 |
| 6,068,029 A * | 5/2000 | Toussagnon et al. | ............. | 141/1 |
| 6,896,012 B2 * | 5/2005 | Wilhelm et al. | ................ | 141/59 |
| 7,207,418 B2 * | 4/2007 | Richardson et al. | ........... | 184/1.5 |

FOREIGN PATENT DOCUMENTS

| DE | 101 49 134 A1 | 4/2003 |
|---|---|---|
| EP | 1 528 291 A2 | 5/2005 |

* cited by examiner

*Primary Examiner* — William E Dondero
*Assistant Examiner* — Mark K Buse
(74) *Attorney, Agent, or Firm* — Davis & Bujold, PLLC; Michael J. Bujold

(57) ABSTRACT

A method of dynamic oil filling of a transmission for a motor vehicle, in particular an automatic transmission, which comprises an oil overflow bore and oil cooler connections. The method comprises the following process steps: a) an initial oil filling of the transmission with a basic quantity of oil, b) drawing off excess oil and at the same time topping up, c) final oil adjustment by a single after-dose, d) closing off the oil overflow bore, e) calculation and topping up with a compensation quantity, in particular for vehicle-specific components. When the result of the calculation is a negative value for the compensation quantity, the calculated compensation quantity is extracted from the oil already filled with the transmission running.

9 Claims, 1 Drawing Sheet

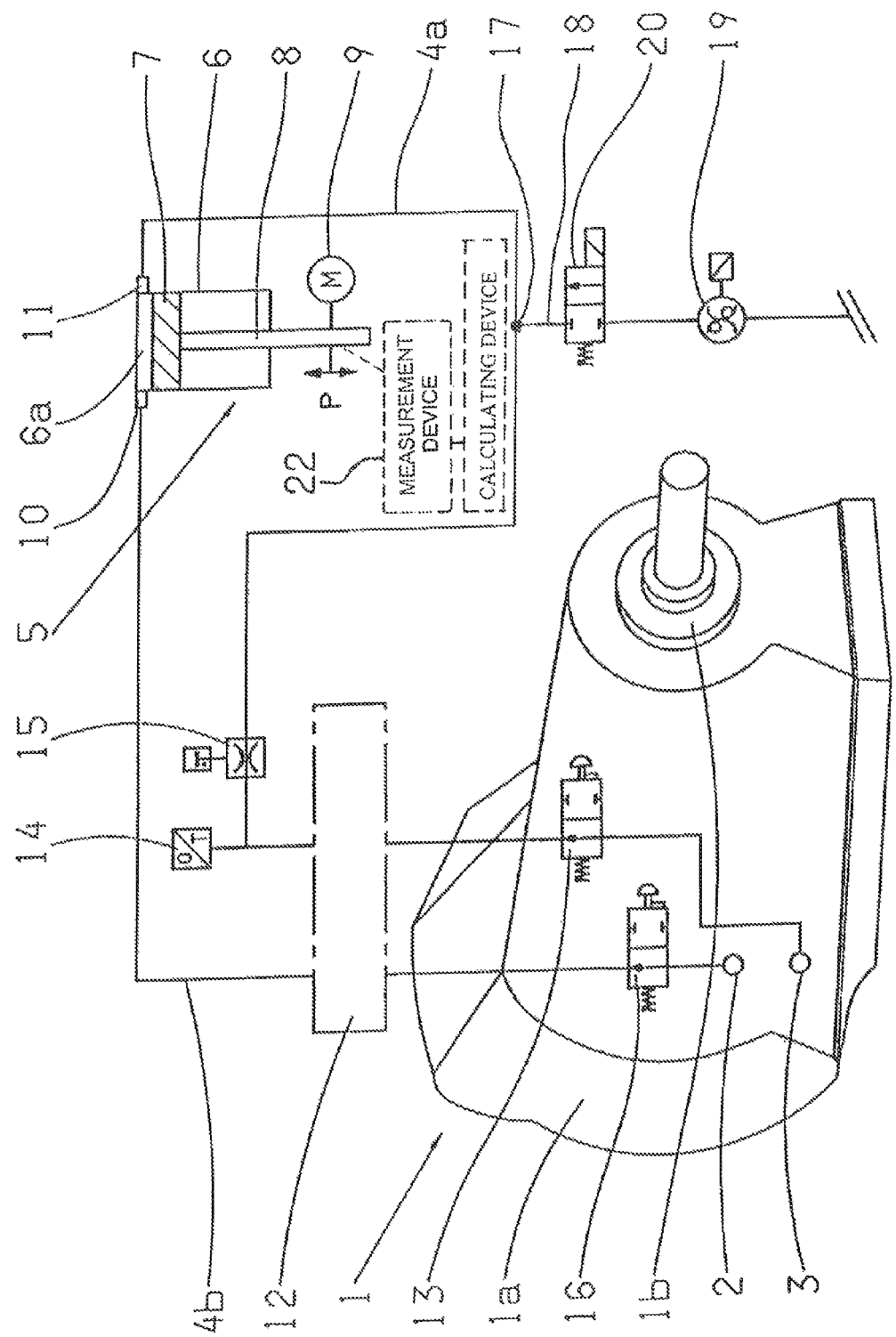

METHOD FOR THE DYNAMIC OIL FILLING OF A TRANSMISSION FOR MOTOR VEHICLES, AND DEVICE FOR CARRYING OUT THE METHOD

This application is a National Stage completion of PCT/EP2009/065349 filed Nov. 18, 2009, which claims priority from German patent application serial no. 10 2008 044 206.2 filed Dec. 1, 2008.

FIELD OF THE INVENTION

The invention concerns a method for the dynamic oil filling of a transmission for motor vehicles, known from DE 101 49 134 A1 by the present applicant, and a device for carrying out the method.

BACKGROUND OF THE INVENTION

From DE 101 49 134 A1 by the present applicant a method is known for the dynamic oil filling and oil level adjustment of a transmission, in particular an automatic transmission for motor vehicles. The oil filling is carried out with the transmission running on a test stand, whereby an initial filling of the transmission with a basic quantity of transmission oil (ATF) takes place first. Then excess oil is drawn off via an oil overflow bore on the transmission and at the same time replenished with fresh oil. Then a final oil adjustment is carried out by a single top-off dose. Thereafter, the oil overflow bore on the transmission is closed off. Finally, taking into account the oil temperature, a factor for defining oil cooler variants in vehicles and the angle at which the transmission is fitted in the vehicle, a so-termed offset quantity, also called the compensation quantity in what follows, is calculated and fed in through an opening in the transmission housing, preferably through a transmission oil cooler connection, which is then blocked temporarily, for example by means of an oil-soluble plug of grease.

A problem arises when the calculation of the offset quantity gives a negative value, i.e. when the transmission has been overfilled. This situation can occur if the transmission is installed in the vehicle in an inclined position so that the oil level in the installed position would rise. In such a case it would be necessary to remove the compensation quantity from the transmission orientated horizontally on the test stand. Since owing to the dynamic filling process the transmission is still running, for example at an idling speed, and the oil overflow bore is already closed, the accurately measured removal of a compensation quantity presents difficulties or requires additional measures which complicate the filling process.

SUMMARY OF THE INVENTION

The purpose of the present invention, with a method of the type described above, is to enable the extraction of a negative compensation quantity in such manner that the extraction takes place as accurately as possible and is corrected for oil temperature. A further purpose of the invention is to provide an inexpensive device which allows the method to be implemented reliably.

According to the invention, it is provided that if the compensation quantity is negative, i.e. if the transmission has been overfilled after the final oil adjustment, the compensation quantity is extracted and this is done with the transmission running and orientated horizontally. Thus, the negative compensation quantity can be extracted dynamically without having to tilt the transmission on the test stand, for example to the position in which it is installed in the vehicle.

In a preferred method variant the negative compensation quantity is pumped out, measured, and collected as an oil volume. Pumping out is preferably carried out by the transmission oil pump, i.e. the compensation quantity to be extracted is under a pressure, for example, of 2 bar. This gives the advantage of an accurate measurement of the compensation quantity, since—unlike when extracting it by suction—no degassing (release of air from the oil) takes place.

Furthermore, as a device for implementing the method, according to the invention, a measurement-cylinder/piston unit is provided, whose working or stroke volume corresponds to the negative compensation quantity to be extracted. This has the advantage that the compensation quantity to be extracted can be measured precisely, collected and stored. It can even be re-introduced into another transmission as a positive compensation quantity.

In a preferred embodiment the measurement-cylinder/piston unit can be coupled into a short-circuit line which connects the oil cooler connections of the transmission. This has the advantage that the negative compensation quantity can be extracted dynamically, i.e. with the transmission running.

In a further advantageous design, the measurement cylinder has an oil inlet opening and an oil outlet opening, its so-termed cylinder connections, which are connected to the transmission oil cooler connections, i.e. the short-circuit line runs through the measurement cylinder but without any dead volume. It is also advantageous to measure the oil temperature of the oil in the short-circuit, so that it can be taken into account when calculating the compensation quantity.

In a further preferred embodiment the pistons of the measurement-cylinder/piston unit can be displaced by electric motor means, in particular electro-mechanically, and the piston movement can be measured by a measurement device. Thanks to the controlled movement of the piston, an accurate measurement and uptake of the negative compensation quantity in the measurement cylinder is ensured.

According to a further preferred embodiment, the measurement-cylinder/piston unit arranged in the short-circuit between the oil cooler connections is an integral component of a filling and testing system for mass-produced transmissions. This has the advantage that the transmission, in particular an automatic transmission, can be routinely and methodically filled on the one hand up to the final oil adjustment and on the other hand up to top off with a positive compensation quantity or extracting a negative compensation quantity, and then sealed ready for transport, all on one and the same device. A further advantage of the measurement cylinder arranged in the short-circuit, is that rapid filling of the transmission with a positive compensation quantity can be carried out if there is already an oil volume in the measurement cylinder, for example after the extraction of a negative compensation quantity.

BRIEF DESCRIPTION OF THE DRAWING

An example embodiment of the invention is illustrated in the sole FIGURE which shows an automatic transmission that is arranged to fill it with transmission oil.

DETAILED DESCRIPTION OF THE PREFERRED EMBODIMENTS

The single FIGURE shows an automatic transmission 1 which, in order to fill it with transmission oil, namely so-termed ATF (Automatic Transmission Fluid), is arranged horizontally on a filling and testing device (not shown). The automatic transmission 1 comprises a converter (not shown), which is positioned inside a converter bell indexed as 1a, i.e. on the input side of the transmission 1, and a drive output side with an output flange 1b. In the housing of the transmission 1 are arranged two oil cooler connections 2, 3 are provided for the feed to and return from a transmission oil cooler (not shown). As a rule the transmission oil cooler is arranged in the forward engine space of the vehicle in the area of a cooling module, and is connected to the transmission housing by lines (not shown).

The transmission 1 is first filled in accordance with a method known from DE 101 49 134 A1 by the present applicant, which is not explained and described in detail here. Rather, reference is made to DE 101 49 134 A1 the content of which is incorporated by reference in the disclosure content of the present application. The oil filling proceeds in accordance with the known method as far as the so-termed final oil adjustment, after which an oil overflow bore (not shown) in the housing is closed off. Thereafter a so-termed offset quantity, called the compensation quantity in what follows, is calculated, and in doing this the oil temperature, an oil cooler variant of the vehicle concerned and the angle at which the transmission is installed in the vehicle are taken into account. From the calculation a positive or negative compensation quantity is obtained. A positive compensation quantity means that the oil must be topped up, the volume of the oil to be added being obtained from, among other things, the oil volume of the transmission oil cooler in the vehicle and in the connection lines to the transmission. Moreover, the installation angle of the transmission in the vehicle can be decisive for a positive compensation quantity (depending on the inclination). The topping up with a positive compensation quantity (offset quantity) is described in the above-mentioned patent application by the present applicant where, in summary, it is said that the calculated offset quantity is preferably added via the transmission oil cooler connection.

As mentioned earlier, however, it can also happen that the calculation yields a negative value for the compensation quantity—which means that the transmission has been over-filled, i.e. from the oil volume already filled in, the negative compensation quantity has to be extracted. In the method according to the invention this is done using the device according to the invention, which will be described below. The two transmission oil cooler connections 2, 3, for brevity called oil cooler connections or connections 2, 3 in what follows, are connected by a short-circuit line 4, also called the short-circuit 4, in which is arranged a measurement-cylinder/piston unit 5. The latter comprises a measurement cylinder 6, a piston 7, a piston rod 8 and a schematically represented electro-mechanical control drive 9 for the piston rod 8, whose movement directions are indicated by a double arrow P. In the area of the end face of the measurement cylinder 6 are arranged cylinder connections 10, 11 via which the inside of the cylinder 6, the working volume 6a, is connected to the short-circuit 4. Though not shown in detail the short-circuit line 4 runs, without forming a dead volume and without giving rise to an appreciable pressure drop, through the measurement cylinder 6. Thus, when the piston 7 is in its end position, i.e. when the stroke volume is zero, the measurement cylinder 6 constitutes a low-loss part of the short-circuit line 4. The part of the short-circuit line 4 that extends between the oil cooler connection 3 and the cylinder connection 11 is called the feed line 4a, while the part of the short-circuit line 4 between the cylinder connection 10 and the oil cooler connection 2 is called the return line 4b. Between the feed line 4a and the return line 4b is indicated a so-termed multiple coupling 12 by means of which the transmission 1 is connected to the test stand (not shown) via further lines (also not shown). In the feed line 4a are arranged a blocking valve 13, a pressure pick-up 14 and a through-flow sensor 15; a blocking valve 16 is arranged in the return line 4b. The feed line 4a is connected via a feed-point 17 to an inlet flow line 18 from which fresh oil can be pumped into the short-circuit line 4. In the inlet flow line 18, which is connected to a fresh oil reservoir (not shown), are arranged a dial gauge 19 for measuring the through-flow quantity, and a blocking valve 20.

The device according to the invention, as described above, works as follows: If the calculation of the compensation quantity yields a positive value a quantity of oil has to be topped up, which takes place via the supply line 18, part of the feed line 4a and the return line 4b, with the blocking valve 16 open to the oil cooler connection 2. When the transmission 1 is filled with a positive compensation quantity, the piston 7 is in the zero position (stroke volume equals zero), so that the fresh oil from the cylinder connection 11 flows through the cylinder 6 to the cylinder connection 10 without any significant pressure drop. Contrary to the representation in the FIGURE the blocking valve 20 is open, and the dial gauge 19 measures the through-flow quantity and switches it off automatically once the calculated compensation quantity has been added.

If the result of the calculation is a negative value for the compensation quantity, this oil volume has to be extracted from the transmission 1 and that takes place via the oil cooler connection 3 and the feed line 4a connected to it, into the measurement cylinder 6. At the beginning of the extraction process or the process of filling the measurement cylinder 6, the piston 7 is in its zero position, i.e. the working volume 6a is equal to zero. As shown, the blocking valve 13 is set to allow through-flow. The pressure and through-flow quantity are detected by the pressure pick-up 14 and the through-flow sensor 15 respectively. The oil to be extracted from the oil cooler connection 3, which is pumped out by a transmission oil pump arranged in the transmission 1 and running at approximately the idling speed, is under a pressure of around 2 bar. This is necessary for filling the measurement cylinder 6, in order to achieve controlled and gas-free filling of the measurement cylinder 6. The oil flowing in via the feed line 4a flows, via the cylinder connection 11, into the working volume 6a of the cylinder 6, and the piston 7, controlled by the electro-mechanical control drive 9, is moved in the direction which enlarges the working volume 6a. The travel of the piston rod 8 or stroke of the piston 7 is detected by a measurement device 22. When the calculated negative compensation quantity is in the measurement cylinder 6, the piston 7 is arrested and this terminates the extraction. Then, to allow transport of the transmission 1 the oil cooler connections 2, 3 are closed, preferably by oil-soluble grease plugs. The transmission 1 has now been correctly filled with oil and can be transported to the vehicle.

INDEXES

1 Automatic transmission
1a Converter bell
1b Output flange
2 Oil cooler connection
3 Oil cooler connection
4 Short-circuit line
4a Feed line
4b Return line
5 Measurement-cylinder/piston unit
6 Measurement cylinder 6a Working volume
7 Piston
8 Piston rod
9 Electro-mechanical control drive
10 Cylinder connection
11 Cylinder connection
12 Multiple coupling
13 Blocking valve
14 Pressure pick-up
15 Through-flow sensor
16 Blocking valve
17 Feed point
18 Inlet flow line
19 Dial gauge
20 Blocking valve
P Piston stroke

The invention claimed is:

1. A device for dynamic oil filling of a transmission (1) of a motor vehicle comprising an oil overflow bore and oil cooler connections (2, 3), the oil cooler connections communicate with an oil circuit via which the transmission (1) is filled with an initial basic oil quantity;
the oil circuit, by way of the oil cooler connections, drawing off excess oil and at the same time topping off with fresh oil;
the oil circuit directing a single after-dose of oil to the transmission to adjust oil in the transmission to a final oil level;
the oil overflow bore is closable after the oil in the transmission has been adjusted to the final oil level;
a calculating device comprising a measurement-cylinder/ piston unit which communicates with the oil circuit for calculating a compensation quantity and topping off the oil in the transmission with the compensation quantity for vehicle-specific components and, a first of the oil cooler connections is a connected to a feed line of the oil circuit such that, if a result of the calculation is a negative value for the compensation quantity, the calculated compensation quantity of oil already filled in the transmission is extracted with the transmission running, and the measurement-cylinder/piston unit (5) defines a working volume (6a) that corresponds to the compensation quantity.

2. The device according to claim 1, wherein the measurement-cylinder/piston unit (5) is connectable into the oil circuit which is connected to the oil cooler connections (2, 3).

3. The device according to claim 2, wherein the measurement-cylinder/piston unit (5) comprises a measurement cylinder (6) which comprises cylinder connections (10, 11) that are connected, via the oil circuit, to the oil cooler connections (2, 3).

4. The device according to claim 3, wherein the oil circuit runs with substantially zero dead volume through the measurement cylinder (6) such that, when the working volume equals zero, oil flows through the measurement cylinder between the cylinder connections with substantially zero pressure drop.

5. The device according to claim 2, wherein the measurement-cylinder/piston unit (5) and the oil circuit are an integrated constituent of a filling and testing system for the transmission (1).

6. The device according to claim 1, wherein a piston (7) of the measurement-cylinder/piston unit (5) is moved by an electric motor, and travel of the piston (7) is measured by a measurement device.

7. A method of dynamic oil filling of a transmission (1) for a motor vehicle comprising an oil overflow bore and oil cooler connections (2, 3), the method comprising the steps of:
a) filling the transmission (1) with an initial basic oil quantity;
b) drawing off excess oil and at the same time topping off with fresh oil;
c) final oil adjusting by a single after-dose;
d) closing off the oil overflow bore; and
e) calculating a compensation quantity with a calculating device comprising a measurement-cylinder device/piston unit which communicates with an oil circuit, and topping off with the compensation quantity for vehicle-specific components and, if a result of the calculation is a negative value for the compensation quantity, the calculated compensation quantity of oil already filled in the transmission is extracted with the transmission running.

8. The method according to claim 7, the method further comprising the step of pumping out, measuring, and collecting the negative compensation quantity as a volume.

9. A method of dynamic filling a transmission (1) of a motor vehicle with oil, and the transmission (1) having an oil overflow bore and oil cooler connections (2, 3), the method comprising the steps of:
filling the transmission (1) with an initial quantity of oil;
simultaneously drawing off excess oil from the oil in the transmission and topping off the oil in the transmission (1) with fresh oil;
adjusting the quantity of oil in the transmission by a single after-dose;
closing the oil overflow bore of the transmission;
calculating, with a calculation device that comprises a measurement-cylinder/piston unit which communicates with an oil circuit, a compensation quantity of oil for the transmission based on oil temperature, a factor for defining oil cooler variants in the motor vehicle and an angle at which the transmission is fitted in the motor vehicle; and
running the transmission and topping off the oil in the transmission (1) with the compensation quantity of oil and, if a value of the compensation quantity of oil is negative, extracting the compensation quantity of oil from the quantity of oil in the transmission (1).

* * * * *